United States Patent [19]

Russo et al.

[11] Patent Number: 5,566,366
[45] Date of Patent: Oct. 15, 1996

[54] METHOD OF POWER CONSERVATION IN A DATA COMMUNICATIONS SYSTEM

[75] Inventors: David W. Russo, Burnaby; Marek Dutkiewicz, Delta, both of Canada

[73] Assignee: Motorola, Inc., Schaumburg, Ill.

[21] Appl. No.: 347,619

[22] Filed: Nov. 30, 1994

[51] Int. Cl.⁶ .................................................. H04B 1/16
[52] U.S. Cl. ........................................ 455/343; 455/54.1
[58] Field of Search ................................ 455/33.1, 34.1, 455/34.2, 38.3, 343, 54.1, 56.1, 62, 63, 161.1, 161.2, 161.3

[56] References Cited

U.S. PATENT DOCUMENTS

| | | | |
|---|---|---|---|
| 4,481,670 | 11/1984 | Freeburg . | |
| 5,168,271 | 12/1992 | Hoff | 455/343 |
| 5,203,012 | 4/1993 | Patsiokas et al. | 455/62 |
| 5,265,270 | 11/1993 | Stengel et al. | 455/343 |
| 5,369,798 | 11/1994 | Lee | 455/343 |
| 5,442,681 | 8/1995 | Kotzin et al. | 455/34.1 |

Primary Examiner—Edward F. Urban
Assistant Examiner—Thanh Le
Attorney, Agent, or Firm—Charles W. Bethards

[57] ABSTRACT

In a data communications system including an infrastructure and a subscriber unit operating with a protocol that mandates proactive scanning, a method of power conservation practiced at the subscriber unit including monitoring a registered data channel during an active time period (403), assessing the data channel during the active time period to provide a channel quality value (407), comparing the channel quality to a first threshold (413), assuming a sleep state when the channel quality satisfies the first threshold (417), and scanning another data channel for another channel quality value that satisfies a second threshold when the channel quality does not satisfy the first threshold (415).

14 Claims, 2 Drawing Sheets

METHOD OF POWER CONSERVATION IN A DATA COMMUNICATIONS SYSTEM

Field Of The Invention

The instant disclosure deals with power conservation and more particularly but not limited to power conservation in a data communications system.

Background Of The Invention

The need for power conservation is known. All else equal including an upper bound on energy density for battery technology, there is a direct tradeoff between portable product package weight and the length of time the product may be used without recharging or replacing an associated battery. Removing the equality qualifter, practitioners continually struggle with tradeoffs and compromises between product utility, product processing speed, memory, or capability, product size, product weight, useful battery life, and battery technology with it's attendant limitations. Almost all agree that compromise is the operative word, no really satisfactory answer has yet been found, and additional power conservation approaches are needed.

A particularly appropriate case in point is data communications systems including battery powered data terminals and their associated data modems. Wireless data communications systems, protocols, network or infrastructure equipment, and modems together with their host terminals have evolved to provide communications service to a growing user base on both outbound and inbound channels. This data communications service is highly dependent on the specific user and that users needs but may be characterized as sporadic and highly interactive with varying message lengths, content, and protocols. As a result of these characteristics equipment suppliers necessarily have emphasized processing speed, accuracy, and user interaction often at the expense of power consumption. More recently the data communications marketplace has begun and is expected to continue to demand portable data terminals and thus data modems that are the functional equivalent of a portable computer combined with a portable two way radio. This market requirement has focused attention on product size and weight and thus battery life and power conservation techniques.

One power conservation technique that has been practiced in data communications systems includes using a system protocol where a particular data terminal or subscriber unit has an assigned time slot for receiving messages. Specifically the system knows this subscriber unit will be "awake" or fully operational or prepared to receive data messages during this assigned time slot. Theoretically, if the time slot is 10% of the total time and the unit assumes or enters a "sleep" or inactive mode during the remaining 90% of a cycle, the subscriber unit can achieve something approaching a 90% power savings over a protocol that does not practice the assigned time slot approach. However for various reasons the theoretical power savings may not be realized.

For example, if the time slot approach is employed in a multi-frequency reuse system and the data terminal, as is typical, has the responsibility to determine what base station, specifically frequency, can best provide data service for it, a significant portion of the potential power savings may be lost to making this determination. In one known such system the protocol mandates a proactive scan on the part of the subscriber terminal. The proactive scan is a procedure where the subscriber terminal during each of the "sleep" time periods or some portion thereof does a scan of other possible frequencies and thereby maintains a list of channels where service may be available. During this scan the terminal or unit is consuming power rather than sleeping or assuming a low power consumption state.

Clearly a need exists for inventive approaches to conserving power and thus extending the battery life of portable data communications equipment and more specifically data communications terminals.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Generally the present disclosure concerns a method of power conservation practiced by a subscriber unit operating in a data communications system with a defined protocol that mandates or requires various operating parameters or conditions at the subscriber unit. More specifically in one such protocol known in the industry as Mobitex the infrastructure sends an overhead message mandating that the subscriber unit conduct a scan of certain non operating channels during what would otherwise ordinarily be an inactive or sleep state. This mandated scan approach has become known as a proactive scan and represents one way of assuring that the subscriber unit always has an up to date list of alternative channels available should the present operating channel become unsatisfactory. However it has been determined that the proactive scan is counter productive in various circumstances for subscriber units desiring to conserve a maximum amount of power.

A preferred embodiment is set in a data communications system that includes an infrastructure and a subscriber unit or plurality of subscriber units where the system operates with a protocol that mandates proactive scanning. This embodiment is a method of power conservation practiced at the subscriber unit that includes monitoring a registered data channel during an active time period; assessing the registered data channel during the active time period to provide a channel quality value; comparing the channel quality value to a first threshold; assuming a sleep state when the channel quality value satisfies the first threshold; and scanning another data channel to provide another channel quality value that satisfies a second threshold when the channel quality value does not satisfy the first threshold.

The monitoring step in more detail further includes a step of receiving an overhead message that includes parameters relevant to the step of scanning another data channel. Such parameters may include how much time to spend scanning, which channels to scan, or what particular thresholds to use. The step of assessing may include measuring a received signal strength (RSSI) or a channel bit error rate (BER) and the channel quality value includes, preferably, some weighted combination of both.

The first threshold should be set at a level, sufficiently above the minimum quality that will allow the registered data channel to carry data communications, that will effectuate a reasonably high probability of finding another acceptable channel prior to complete failure of the present registered data channel. The second threshold should be set at a level that affords some confidence that this channel will support data communications if the subscriber unit registers on it. The final settings will depend on the data communications system design as well as system objectives and desired system capacity.

Figure 1:
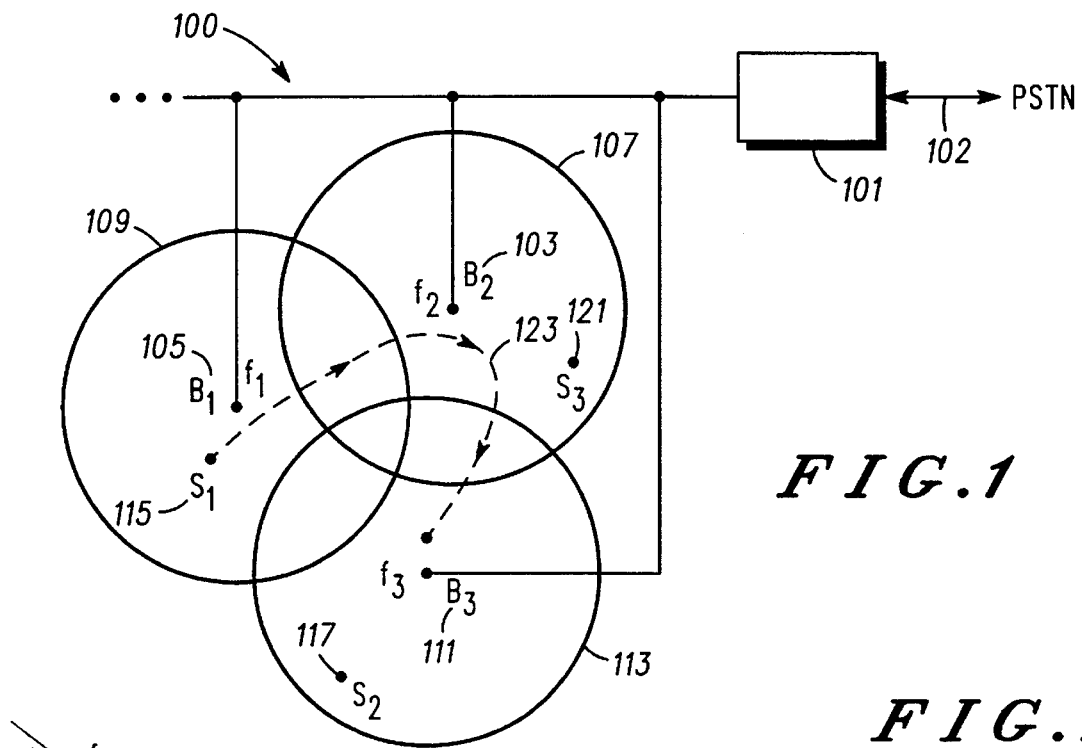
FIG. 1 is a block diagram of a wireless data communications system suitable for employing an embodiment in accordance with the instant invention.

The instant invention may be more fully developed and appreciated with reference to the figures in which FIG. 1 depicts a representative diagram of a data communications system suitable for employing various techniques for power conservation in accordance with the present invention. The FIG. 1 data communications system depicts an infrastructure (100) including a network controller (101) that is coupled to a public switched data network (PSDN) (102), such as the public switched telephone network, and to one or more base stations, such as base stations B1, B2, B3, etc. 105, 103, 111, etc. Exemplary versions of all equipment are available from suppliers or manufacturers such as Motorola Inc.

Generally the network controller controls the network or infrastructure and coordinates the delivery and receipt of messages to and from the base stations B1, B2, and B3 and their respective origins and destinations. B1 (105) has a geographic coverage area (109) within which it may deliver and receive messages from subscriber units, such as subscriber unit S1 (115). The subscriber units are available from various manufacturers such as Motorola Inc. under various trade names such as InfoTac. Similarly B2 (103) has a geographic coverage area (107) within which it may deliver and receive messages from subscriber units, such as S3 (121) or S1 as S1 travels along the representative path (123). Similarly B3 (111) provides coverage over an area (113) and may provide service to subscriber units, such as S2 (117) or S1 (115) as it travels along path (123). The base stations B1, B2, and B3 may operate on distinct frequencies f1, f2, and f3 and be part of a multi-frequency reuse system. It is understood that FIG. 1 necessarily is a much simplified representative diagram and that actual systems may be far more complicated. Generally the data communications system (100) is intended to supply specific messages to/from specific subscriber units or devices in a largely transparent (to end users) fashion.

Figure 2:
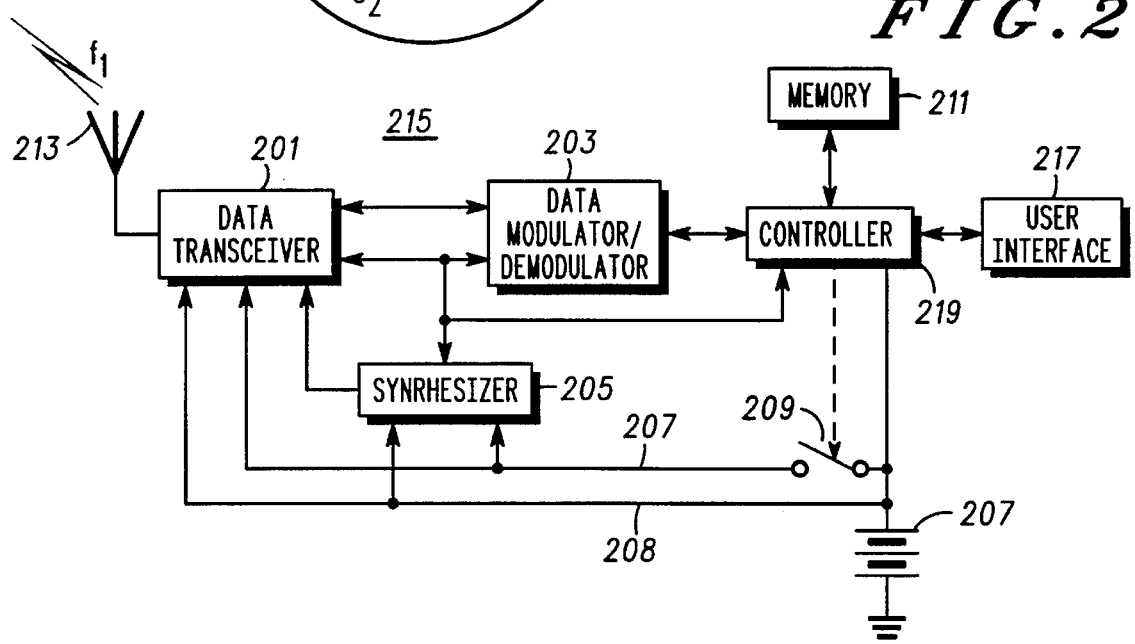
FIG. 2 is a block diagram of a data terminal adaptable for operation in the FIG. 1 system.

Turning now to a description of a subscriber unit or terminal or data terminal, such as subscriber unit S1 (115), with reference to the FIG. 2 block diagram, wherein radio signals on an operating frequency such as f1, are transmitted to and from or between the base stations B1, B2, or B3 and an antenna (213) that is coupled to the balance of subscriber unit (215). The subscriber unit (215) operates to convert radio signals into data messages for the end user and vice a versa in addition to establishing and maintaining the radio communications link with the infrastructure (100). The data messages by way of a controller (219), are supplied to or received from a user interface (217) such as a keyboard or display that may be an integral part of the subscriber unit or alternatively may be a host computer or device.

Specifically, the antenna (213) is coupled to a data transceiver (201). The transceiver (201) includes a receiver and a transmitter and associated functions (not specifically shown) all as well known and operates to convert radio signals at the antenna (213) to a data wave form that is coupled to a data modulator/demodulator (203) or alternatively to convert a data wave form, supplied by the data modulator/demodulator (203), to a radio signal for transmission over the radio channel (109).

The data modulator/demodulator (203) operates to convert the analog data wave form, as provided by the data transceiver (201) to a digital form or binary symbol representation, or alternatively to convert digital data to an analog wave form suitable for further transmission by the data transceiver (201). The digital form of the data produced by the data modulator/ demodulator (203) is provided to the controller (219) as a data message. Digital data that is converted by the data modulator/demodulator (203) to an analog wave form is supplied from the controller (219).

The controller (219) receives data messages from and provides or delivers data messages to the modulator/demodulator (203) and generally effects some interpretation of the messages including, for example, executing instructions that may be provided in overhead messages. The controller (219) provides various control functions for the other elements of the subscriber unit (215) and manages the interface between the user interface (217) and the balance of the subscriber unit (215). Such control functions include data routing between the various elements and programming of a synthesizer (205) to provide the appropriate transmit and receive injection frequencies to the data transceiver (201).

The controller (219) further controls whether and when the modem (103) enters a power conservation or lower power consumption state in accordance with the method embodiments of the instant invention as further described below. This power control function is accomplished under appropriate circumstances by selectively operating a switch (209) under the control of the controller (219). The switch (209) operates to couple or de-couple a power source (207), such as preferably a battery, to certain higher consumption, non essential in some circumstances, functions such as the data transceiver (201), data modulator/demodulator (203), and synthesizer (205).

FIG. 2 depicts, flowing to the respective functional elements, a switched power bus (207) coupled through the switch (209) and an unswitched power bus (208). In practice as depicted it likely is preferable to switch only a portion of the power to these elements in which case only a portion of the relevant element would enter a power conservation state. In addition to controlling the switch (209), the controller (219) may implement other power conservation procedures, such as entering a lower power standby mode or controlling the memory (211) or user interface (217) to enter a standby mode.

The subscriber unit (215), including component parts as described above and as shown in FIG. 2, are more fully described in and may be more fully appreciated by reference to the Motorola Service Manual titled InfoTAC Technical Manual and designated 68P02939C95. The data transceiver described in this manual is well known. A digital signal processor (MCM56001) is used for the data modulator/ demodulator function. A Motorola HC11 controller (M68HC11A1) executing appropriate software that is stored preferably within the HC11 or alternatively within memory (211) is the basic element that provides the controller (219) function. The balance of the product includes generally the user interface (217) including a liquid crystal display used for various indicators and various switch actuators along with a random access memory (211) that is used as a buffer for messages and other temporary storage. Finally various power switching circuitry all as well known in the art is provided to selectively enable component power control or enter the power conservation state.

Figure 3:
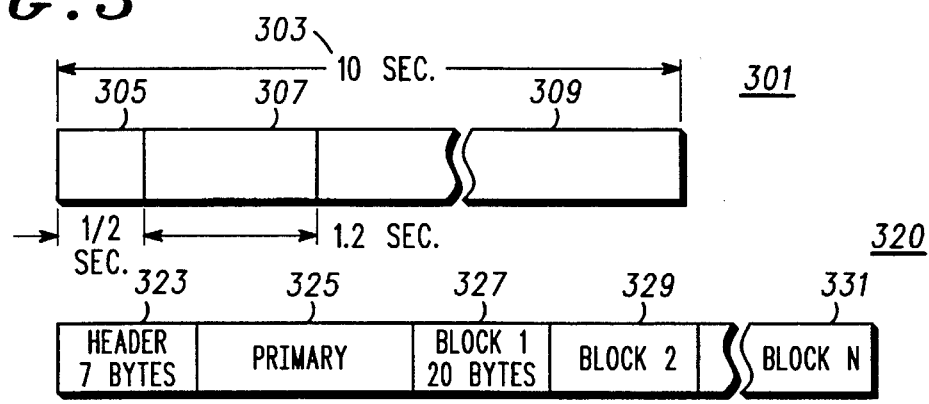
FIG. 3 is a data frame and data packet structure diagram for a protocol suitable for use in the FIG. 1 system.

Referring to FIG. 3 a brief overview of the data frame and packet structure for one known protocol suitable for practicing an embodiment of the invention will be described. For those seeking further more detailed information regarding this protocol they are referred to a specification titled "Mobitex Terminal Specification", Issue 2, Rev 3A dated January 1992 available from RAM Mobile Data, Inc. at 10 Woodbridge Center Drive, Woodbridge, N.J. 07095. FIG. 3 depicts a representative data frame (301) that has a duration (303) that is system configurable but nominally 10 seconds in duration. The protocol dictates that all subscriber units will monitor the active or registered channel at the beginning of the data frame (301) for a first time period (305) that typically lasts for approximately ½ second. During the first time period (305) the subscriber units are provided with various supervisory messages that contain supervisory information including, for example, whether they will receive data messages during this data frame, various system channel lists, various system parameters such as the number of repeats, when the next data frame will start, and various proactive scanning parameters, such as, how long to scan each channel and the total time to devote to scanning other channels.

If the supervisory messages indicate that a particular subscriber unit will receive a data message during this data frame the unit continues to monitor the channel for this message. If no message for this unit will be transmitted during this data frame, and this is the ordinary case for the majority of units, the device is directed to initiate a proactive scan of other possible channels during a second time period (307) that is nominally 1.2 seconds. This proactive scan serves the purpose of identifying other channels for possible registration attempts if the current registered channel degrades to a point where data communications is no longer possible. After the second time period (307) has lapsed the subscriber unit is free to enter a low power consumption or sleep mode until the next data frame begins.

Within a data frame information is organized into data packets, such as data packet (320). A header (323) includes seven bytes that represent a bit sync and frame sync pattern and base station identifier along with error detection bits. Following that is a primary block (325) that identifies the type of packet that may be any one of 21 different kinds of packets including, for example, six different supervisory packets, data packet, acknowledge or negative acknowledge packets or a repeat packet. Depending on the primary packet it may be followed by a variable number of blocks of information such as block 1 (327), block 2 (329), up to block n (331). Each block is 20 bytes long including 12 data bytes, 6 forward error correction bytes and 2 checksum bytes. Again for further information regarding the data frame or packet structure and contents the reader is referred to the above referenced specification.

Figure 4:
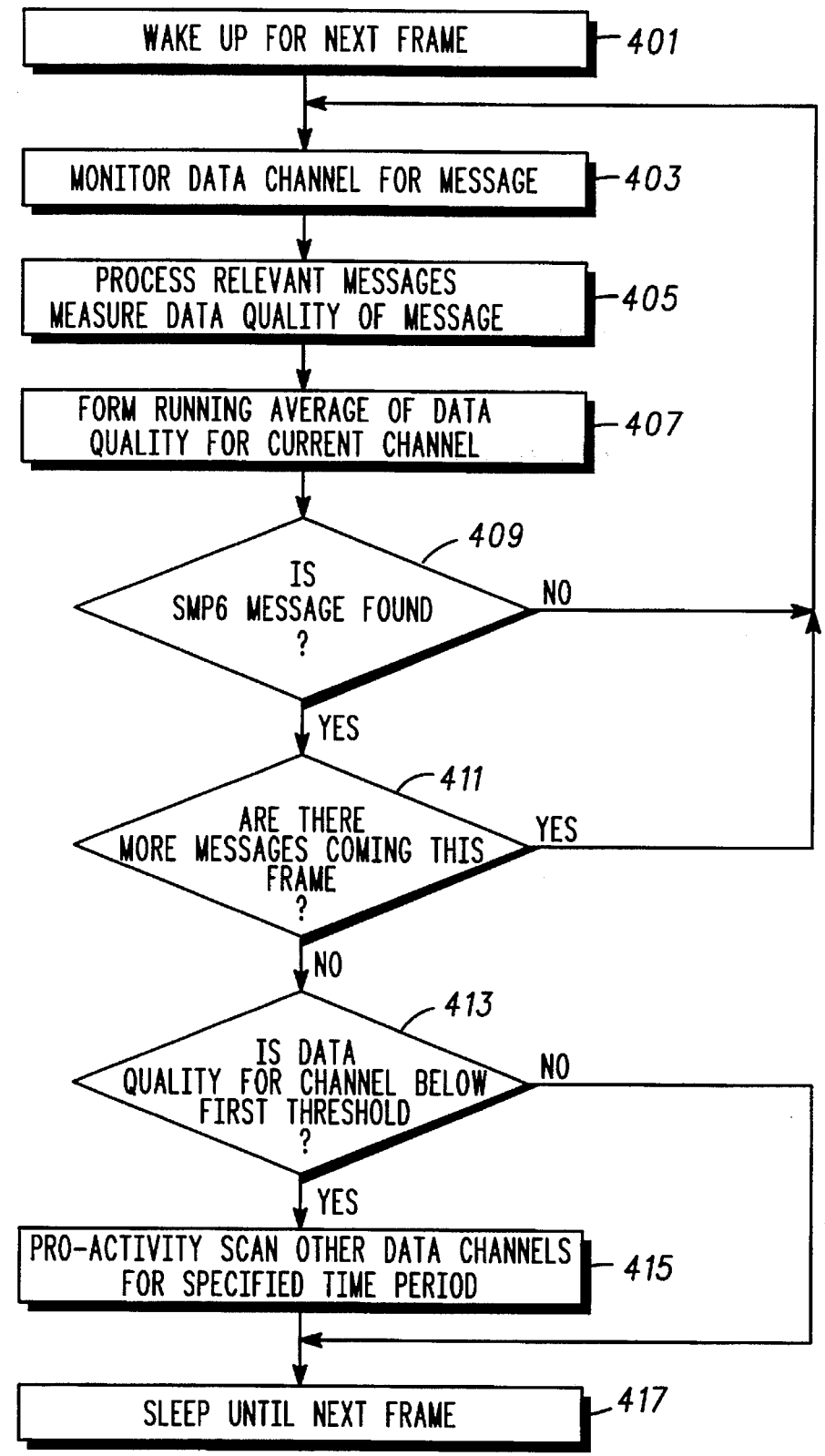
FIG. 4 is a flow chart of a method of power conservation in accordance with the instant invention.

For purposes of further explanation with reference to the FIG. 4 flow chart, consider the situation observed by the subscriber unit S1 (115) as it traverses the representative path (123). By observation B1 will initially be best able to provide service, then either B1 or B2, then B2 only, then B2 and B3, and eventually only B3. From time to time S1 will need to select another data channel to subsequently register on, however ordinarily service on the present registered data channel will be entirely satisfactory for a significant portion of the time the subscriber unit (115) is in range of B1.

Referring to FIG. 4 a preferred method embodiment of power conservation practiced at the subscriber unit (115) as it traverses the path (123) in the communications system of FIG. 1 will be described. This method is suitable for execution by any general purpose or special purpose processor (not specifically shown but included as part of the subscriber unit's controller (219) function) that has been programmed with the appropriate software and is interfaced with or controlling a receiver arranged to receive signals and assess signal strength, etc. This method begins at step (401) where the subscriber unit wakes up at the beginning of a data frame and at step (403) monitors the registered data channel during an active period after awaking by receiving overhead messages, such as supervisory messages etc.

The subscriber unit then at step (405) processes all relevant messages such as supervisory messages intended for portable subscriber units and supervisory messages specifying which subscriber units can expect to receive a data message during this data frame. The data quality on the registered data channel is measured or assessed by, for example, measuring RSSI and or BER during these messages by reading an RSSI circuit for signal strength and comparing the actual bit patterns to expected bit patterns. At step (407) a running average of data quality for the current registered channel is constructed to provide a channel quality value for the current registered data channel.

At step (409) if the sixth supervisory message which specifies what subscriber units are getting messages during this data frame as well as the various parameters to use for scanning for other data channels has been received the process moves to step (411) and if not returns to step (403) and repeats. At step (411) if the subscriber unit is intended to get more messages after the sixth supervisory message the process again returns to step (403) and repeats, else proceeds to step (413) where the channel quality value is compared to a first threshold. If the channel quality value satisfies the first threshold, a system configurable value, the unit forgoes the protocol mandated proactive scan and goes to power conservation state until the beginning of the next frame at step (417). If the data quality or channel quality value does not satisfy the first threshold or is worse than this threshold the subscriber unit at step (415) enters a proactive scan of other data channels for another channel quality value that does satisfies a second threshold, again a system configurable parameter.

By ignoring the pro-active scan cycle that is mandated by some system protocols, except as conditioned on necessity, the majority of units will very often increase the percentage of time they are a sleep from something on the order of 8.3 seconds out of every ten seconds to more like 9.5 seconds out of every ten seconds. It has been experimentally shown that this inventive approach saves approximately 40% of the battery capacity for a portable subscriber unit given typical system designs and data traffic.

It will be appreciated by those of ordinary skill in the art that the apparatus and methods disclosed provide various methods for conserving power without compromising data communications integrity or otherwise un-necessarily burdening data communications. These inventive methods may be readily and advantageously employed in a wireless packet data subscriber unit or other communications device or system to provide power conservation and thus extend battery life. Hence, the present invention, in furtherance of satisfying a long-felt need of wireless data communications, readily facilitates portable data modems by providing an exemplary method of power conservation that can yield a useful battery life from a portable battery size.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a communications apparatus, a method comprising:

monitoring a data channel during an active time period;

determining a channel quality value for the data channel during at least a portion of said active time period;

upon completion of the active time period comparing said channel quality value to a first threshold;

entering a sleep state when said channel quality value satisfies said first threshold; and scanning another data channel for another channel quality value that satisfies a second threshold when said channel quality value does not satisfy said first threshold.

2. The method of claim 1 wherein said step of monitoring further includes a step of receiving an overhead message that includes parameters for performing a scan of another data channel.

3. The method of claim 2 wherein said step of monitoring further includes a step of receiving an overhead message including at least one of a scan period parameter, a threshold value parameter for use as the second threshold, and a channel quality parameter defining a measure of channel quality based on at least one of a received signal strength and a bit error rate.

4. The method of claim 1 wherein said step of determining further includes measuring a received signal strength and a bit error rate and using a combination of the received signal strength and a bit error rate to provide said channel quality value.

5. The method of claim 1, wherein the step of monitoring further comprises monitoring a data channel during the active time period for a message for the communications apparatus and decoding the message.

6. The method of claim 5, wherein the step of determining comprises determining the channel quality value based at least in part from an overhead message portion and the message.

7. The method of claim 1, wherein the step of determining comprises determining the channel quality value based on an average of a current channel quality of said at least a portion of said active time period and a preceding channel quality of at least a portion of a preceding active time period.

8. A communications apparatus, comprising:

means for waking a portion of the communications apparatus up from an inactive time period;

means for monitoring a data channel during an active time period;

means for determining a channel quality value for the data channel during at least a portion of said active time period, and upon completion of the active time period, comparing said channel quality value to a first threshold;

wherein the means for waking up is further operable for causing said portion of the communications apparatus to enter a sleep state when said channel quality value satisfies said first threshold; and wherein the means for determining is further operable for scanning another data channel for another channel quality value that satisfies a second threshold when said channel quality value does not satisfy said first threshold, and then controlling said means for waking to cause said portion of the communications apparatus to enter the sleep state.

9. The apparatus of claim 8 wherein said means for monitoring is further operable for receiving an overhead message that includes parameters for performing a scan of another data channel.

10. The apparatus of claim 9 wherein said means for monitoring is further operable for receiving an overhead message including at least one of a scan period parameter, a threshold value parameter for use as the second threshold, and a channel quality parameter defining a measure of channel quality based on at least one of a received signal strength and a bit error rate.

11. The apparatus of claim 8 wherein the means for determining is further operable for measuring a received signal strength and a bit error rate and using a combination of the received signal strength and a bit error rate to provide said channel quality value.

12. The apparatus of claim 8, wherein the means for monitoring is further operable for monitoring a data channel during the active time period for a message for the communications apparatus and decoding the message.

13. The apparatus of claim 12, wherein the means for determining is further operable for determining the channel quality value based at least in part from an overhead message portion and the message.

14. The apparatus of claim 8, wherein the means for determining is further operable for determining the channel quality value based on an average of a current channel quality of said at least a portion of said active time period and a preceding channel quality of at least a portion of a preceding active time period.

* * * * *